US 6,600,598 B1

(12) United States Patent
Piekos (10) Patent No.: US 6,600,598 B1
(45) Date of Patent: Jul. 29, 2003

(54) METHOD AND APPARATUS FOR PRODUCING DIFFRACTED-LIGHT CONTRAST ENHANCEMENT IN MICROSCOPES

(76) Inventor: W. Barry Piekos, 126 Bedford Ave., Hamden, CT (US) 06517

( * ) Notice: Subject to any disclaimer, the term of this patent is extended or adjusted under 35 U.S.C. 154(b) by 0 days.

(21) Appl. No.: 09/786,306
(22) PCT Filed: Sep. 1, 1999
(86) PCT No.: PCT/US99/20163
  § 371 (c)(1),
  (2), (4) Date: Mar. 2, 2001
(87) PCT Pub. No.: WO00/13055
  PCT Pub. Date: Mar. 9, 2000

Related U.S. Application Data
(60) Provisional application No. 60/098,863, filed on Sep. 2, 1998, and provisional application No. 60/110,627, filed on Dec. 2, 1998.

(51) Int. Cl.[7] .............................................. G02B 21/06
(52) U.S. Cl. ....................................... 359/385; 359/370
(58) Field of Search ............................... 359/368, 370, 359/381, 385, 388

(56) References Cited

U.S. PATENT DOCUMENTS

| 863,805 | A |   | 8/1907 | Ott |
| 1,503,800 | A |   | 5/1924 | Ott |
| 2,195,166 | A |   | 3/1940 | Diggins |
| 3,490,828 | A |   | 1/1970 | Rehm |
| 3,646,608 | A |   | 2/1972 | Rowland |
| 4,255,014 | A | * | 3/1981 | Ellis |
| 4,407,569 | A |   | 10/1983 | Pillar et al. |
| 4,487,486 | A |   | 12/1984 | Hayasaka |
| 5,086,222 | A |   | 2/1992 | Shibuya |
| 5,345,333 | A |   | 9/1994 | Greenberg |
| 5,394,263 | A |   | 2/1995 | Galt et al. |
| 5,592,328 | A |   | 1/1997 | Greenberg |
| 5,673,144 | A |   | 9/1997 | Chastang et al. |
| 5,684,626 | A |   | 11/1997 | Greenberg |
| 5,703,714 | A |   | 12/1997 | Kojima |
| 5,706,128 | A |   | 1/1998 | Greenberg |
| 5,715,081 | A |   | 2/1998 | Chastang et al. |
| 5,729,385 | A |   | 3/1998 | Nishida et al. |

OTHER PUBLICATIONS

Axelrod, Zero–Cost Modification of Bright Field Microscopes for Imaging Phase Gradient on Cells: Schlieren Optics, Cell Biophysics, 1981, pp. 167–173, vol. 3, The Humana Press Inc.

Bloss, An Introduction to the Methods of Optical Crystallography, 1967, pp. 52–55, Holt, Rinehart and Winston, New York.

Ellis, Advances in Visualization of Mitosis In Vivo, Cell Reproduction, 1978, pp. 465–476, Academic Press, New York.

(List continued on next page.)

Primary Examiner—Mark A. Robinson
(74) Attorney, Agent, or Firm—Albert W. Watkins (57) ABSTRACT

A plate (130) with a convex edge (137) which is inserted within the optical path (190) of a microscope (100) produces a chromatic region (230). Refractive specimens (240) illuminated by this chromatic region (230) have enhanced contrast and an improved three-dimensional shadowcast effect. The plate (130) is small enough to only block a minority of light passing through the optical path (190), and is centrally located within the optical path (190) to minimize astigmatic error. The plate (130) may be manufactured simply and durably, and is readily applied to existing microscopes as an add-on tool for viewing specimens. Additional methods are disclosed for making and using the plate (130) which offer further advantage and benefit.

20 Claims, 4 Drawing Sheets

OTHER PUBLICATIONS

Hoffman and Gross,Modulation Contrast Microscope, Applied Optics, May 1975, pp. 1169–1176, Vol 14, No. 5.

Saylor, Accuracy of Microscopical Methods for Determining Refractive Index by Immersion, Journal of Research of the National Bureau of Standards, Sep. 1935, pp. 277–294, Vol 15.

Wright, Methods of Petrographic–Microscopic Research, 1911, pp. 71–73, Carnegie Institution of Washington, Pub 158:73.

Wright, Oblique Illumination in Petrographic Microscopic Work, American Journal of Science, 1913, pp. 63–82, Vol 205.

Peikos, Diffracted–Light Contrast Enhancement: A Re-examination of Oblique Illumination, Microscopy Research and Technique, 1999, pp 334–7, vol. 46, Wiley–Liss.

* cited by examiner

METHOD AND APPARATUS FOR PRODUCING DIFFRACTED-LIGHT CONTRAST ENHANCEMENT IN MICROSCOPES

CROSS REFERENCE TO RELATED APPLICATIONS

This application claim priority to U.S. application Serial No. 60/098,863, filed Sep. 2, 1998, entitled "Edge-Wave Contrast Enhancement for Microscopes," and also to U.S. application Serial No. 60/110,627, entitled "A Device for Producing Diffracted-Light Contrast Enhancement in Microscopes," filed Dec. 2, 1998, the contents of each which are incorporated herein by reference in their entirety.

BACKGROUND OF THE INVENTION

1. Field of the Invention

This invention pertains most generally to optics systems and elements, and more particularly to illumination systems within bright-field microscopes. Through the teachings of the present invention, light control within the optical path of the microscope is achieved by rotating an opaque, convex element through the light path to produce a highly beneficial contrast enhancement.

2. Description of the Related Art

Microscopes are well-known to provide magnification of small portions or samples of living or inanimate material. A sample prepared for viewing through the microscope is most generally referred to as the specimen, and may be a living biological organism, or may alternatively be other matter, whether organic or inorganic in origin. Optical bright-field microscopes, which are the subject of the present invention, magnify images formed from light passing through and about a sample for viewing of features that are ordinarily too small to be seen clearly with the naked eye. The sample may be translucent, transparent, or have some combination of varying opacity that may include opaque material as well, though with bright-field microscopes as referred to herein, the samples must have some translucence through which light may pass for viewing. The sample may also vary greatly in size, though in most instances the specimen is a relatively small sample of matter such as may be readily placed upon a carrier referred to as the slide. For those less familiar with microscopy, the slide acts as a holder substrate upon which the relatively small specimen may be supported, for transport to the microscope for viewing and, depending upon the specimen, potentially for subsequent storage or archiving. In bright-field microscopy, the slide will most preferably be of an optically transparent or translucent material, and is frequently fabricated from transparent glass.

Within the bright-field microscope, light generated by a light source is typically gathered by a collector lens and concentrated by a condenser upon the stage of the microscope. The specimen is mounted upon the stage, and the light passes through and about the specimen. The image is then magnified through a combination of objective lens and eyepiece or ocular lens, for subsequent viewing or photographing.

Bright-field microscopy is quite old, and is not limited to the inclusion of condensers or collector lenses. Prior art microscopes have been used with light-gathering mirrors and other structures that use alternative light sources such as sunlight and other natural light, as well as artificial lights that have been generated from lanterns and candles as well as electric light bulbs. As is known to those working in the field, electric light bulbs offer a particularly convenient and predictable source of light, and so today most laboratory grade microscopes include some combination of bulb, collector lens and condenser.

Various adaptations and techniques have been developed through time to enhance bright-field microscopes. A frequent goal is to improve detection and differentiation of features within a specimen. Among the more well documented methods are staining of biological specimens, illumination at oblique angles, and various contrast enhancing techniques such as phase-contrast, differential interference contrast, and single-sideband microscopy. By staining a specimen, differences in permeability and/or absorption of the stain lead to visual distinctions between various components of the specimen, and can assist greatly in the identification of the specimen. Unfortunately, once stained, the specimen is not readily returned to the state it was in prior to staining. As a result, a single specimen may not be readily analyzed by multiple methods including staining unless the staining is preserved for a last action. Unfortunately then, all other data desired to be gathered must be completely collected prior to staining, other than that derived from the staining, and no second party verification or confirmation is possible once the staining is complete. If the staining should reveal a need for further testing, absent the stain, such testing will not be possible on that sample. Particularly where samples are only available for testing in limited supply, or where independent review at different times is preferred, this drawback of staining can be quite undesirable.

Unlike staining, other methods are non-destructive and do not alter the specimen. Illumination at oblique angles produces visible reflection and refraction at the interfaces between materials having even relatively small differences in indices of refraction. Several techniques have been proposed for oblique illumination, including the use of an eccentric mount in association with the condenser aperture, variously referred to as the iris diaphragm or condenser diaphragm, and herein referred to as the aperture diaphragm. By using an eccentric mount, the aperture diaphragm may be shifted from a central position, which passes an equal amount of light from all directions about the central optical axis, to an off-axis position which only passes illumination from one side of the central optical axis through the condenser to the stage. This technique, which is discussed for example by H. N. Ott in U.S. Pat. No. 863,805, does result in a shadowcast image with improved contrast. However, resolution of smaller features within the specimen is sacrificed, and depth of field is undesirably increased due to the reduced numerical aperture of the condenser. For those less familiar with bright-field microscopes, depth of field represents the distance which is in focus along the axis of light transmission through the sample. For an infinitely thin sample, depth of field is not particularly significant. However, as one might imagine, when the sample gets thicker along the axis of light transmission, which it will in all living samples, there will be more and more features within the optical path. If many of these features remain in focus, which is what happens as the depth of field increases, then the image will become progressively more cluttered. Since a more cluttered viewing field makes identification of features more difficult, an increased depth of field is usually quite undesirable.

A similar technique is also illustrated by Ott in U.S. Pat. No. 1,501,800, as well as by Diggins in U.S. Pat. No. 2,195,166, where they each illustrate a concave-shaped oblique light diaphragm which is mounted adjacent the iris diaphragm. The oblique diaphragm includes a leaf which partially and progressively blocks light from one side of the diaphragm as the leaf rotates into the light path from one side thereof. Unfortunately, while the oblique light diaphragm is an improvement which less reduces the numerical aperture of the condenser than the earlier Ott patent, the depth of field is still increased by these Ott and Diggins inventions, and the resultant image is less than desirable. Furthermore, and as will be described in more detail hereinbelow with reference to the present invention, the concave surface illustrated by Ott and Diggins offers undesired interference in the resultant light path, which results in less contrast and a more two-dimensional image.

Rehm, in U.S. Pat. No. 3,490,828 illustrates another oblique illumination method, this time varying the light source from an on-axis mirror to a second off-axis mirror, the off-axis mirror which may be positioned for diverse angles of light incident upon the stage and specimen. While this invention offers the advantage of not significantly altering the depth of field which is in focus, thereby allowing a viewer to focus on relatively narrow vertical sections within a specimen without visual clutter, the Rehm invention requires a specially designed microscope, and may not be readily retrofit onto existing microscopes. Further, the Rehm invention does not offer advantages which are inherent in the use of diffracted light, this feature which will be discussed more fully hereinbelow with regard to the present invention. Instead, the Rehm invention is limited to oblique, full wave incident light. A similar off-axis mirror system is illustrated by Greenberg in U.S. Pat. Nos. 5,345,333 and 5,592,328, which also suffers from the same disadvantages and drawbacks.

Other various contrast enhancing techniques modify the illuminating beam, generally by altering the condenser by the inclusion of special apertures, polarizers and prisms, or half-masks. The resulting image is then filtered or modulated at the image plane of the objective lens. These techniques require several additional components and, frequently, fairly sophisticated image analyzers or electronic contrast enhancement. Examples of these are found, for example, in U.S. Pat. No. 4,407,569 to Piller et al; U.S. Pat. No. 5,394,263 to Galt et al; U.S. Pat. Nos. 5,673,144 and 5,715,081 to Chastang et al; U.S. Pat. Nos. 5,684,626 and 5,706,128 to Greenberg; U.S. Pat. No. 5,703,714 to Kojima; and U.S. Pat. No. 5,729,385 to Nishida et al. While many of these techniques offer improved image properties, the complexity and cost associated with these methods limit their application to only a few special purpose research grade microscopes. The techniques are not readily adapted to existing microscopes or lower cost student or general laboratory applications.

SUMMARY OF THE INVENTION

In a first manifestation, the invention is a combined device for enhancing contrast of a refractive specimen. The device includes a microscope having a stage for locating a specimen within an optical path, a source of light, and a means for forming an enlarged virtual image of the specimen. The microscope is combined with a convex edge plate within the optical path. The convex edge plate alters light travelling through the optical path to produce diffracted light, which illuminates the specimen. According to further features of the first manifestation, the convex edge plate is sufficiently wide that diffracted light is passed from only one edge onto the specimen, while the plate is also sufficiently narrow so as to only block a minority of light passing through the optical path.

In a second manifestation, the invention is a method for enhancing contrast of a refractive specimen comprising the steps of diffracting light within an optical pathway and defocussing the condenser lens by relative motion between the diffracting means and the condenser lens to illuminate a portion of the refractive specimen with diffracted light.

In a third manifestation, the invention is a diverging chromatic light source formed adjacent a juncture between a dark shadow and a bright field which interacts with a refractive specimen to form distinctive optical illumination maximums and minimums, in combination with an optical display for displaying the distinctive illumination as a major part of the field of view within the display.

OBJECTS OF THE INVENTION

A first object of the present invention is to provide a contrast-enhancing illumination method. A second object is to enhance contrast without altering a specimen, such that the specimen may readily be preserved unaltered for future or alternative analysis. A third object of the invention is to provide apparatus which may be placed within both new and existing microscopes at various locations within the optical path, and which is not limited to only one or a few types or brands of microscopes. A further object of the invention is to provide a low-cost apparatus which is readily purchased by owners of existing microscopes and which offers image enhancement comparable to much more costly systems of the prior art. These and other objects of the invention are achieved by the preferred embodiment, which is described hereinbelow and which will be best understood in conjunction with the appended drawing figures.

DESCRIPTION OF THE PREFERRED EMBODIMENT

Figure 1:
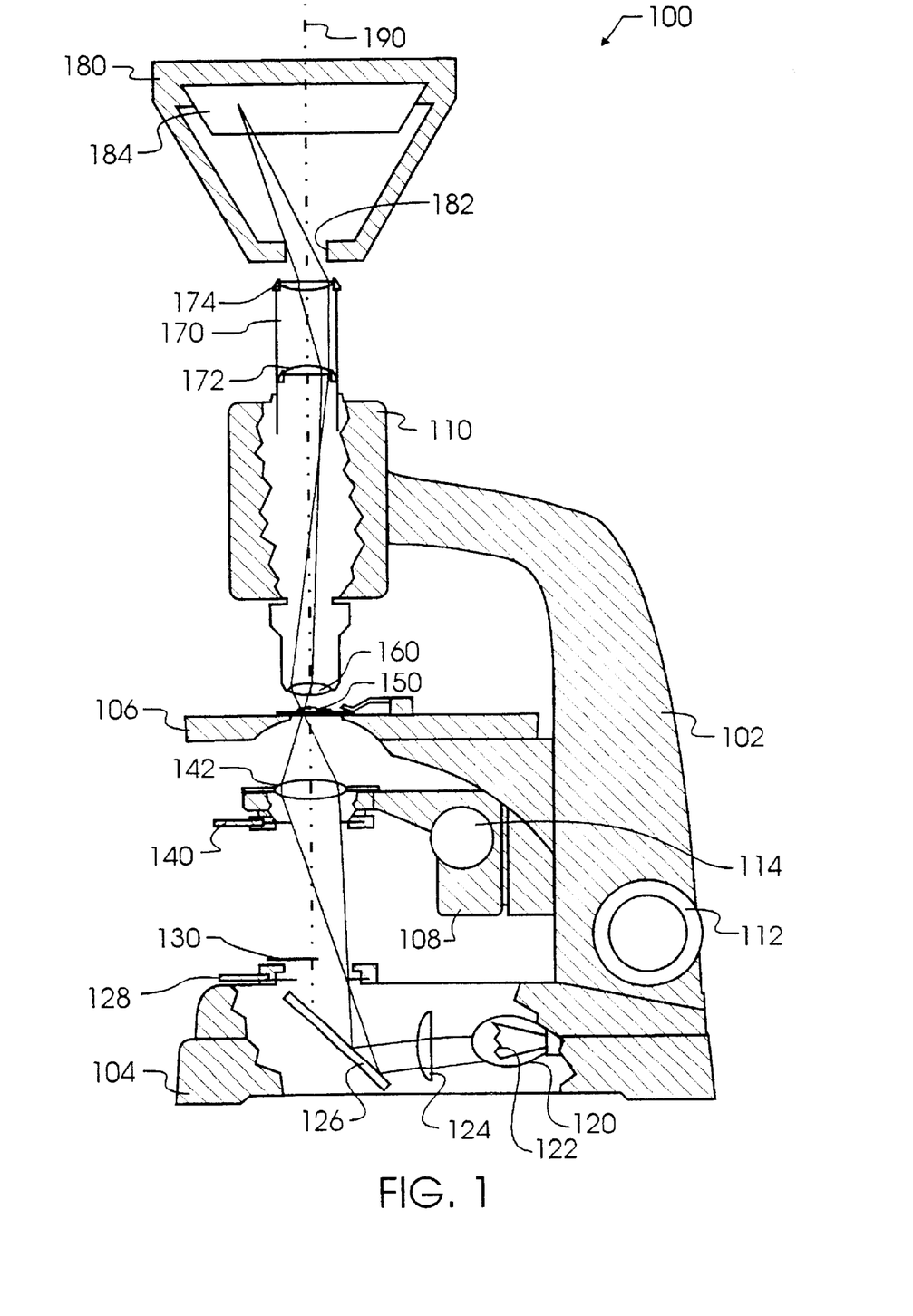
FIG. 1 illustrates a photographic microscope in combination with a preferred embodiment apparatus of the invention.

As shown in FIG. 1, microscope 100 includes a body 102 extending vertically at a first end from base 104. Body 102 supports at a second end a body tube 110, which, along with base 104, is sufficiently rigidly attached to body 102 to provide support for the remaining components of microscope 100. A stage 106 is supported between body tube 110 and base 104 which locates a specimen 150 within the optical pathway along optical axis 190. Stage 160 is typically supported from within appropriate structure within body 102 so as to be vertically adjustable closer to and further from objective 160 by rotation of objective focus adjustment knob 112. Carried with stage 106 is condenser 142 and aperture diaphragm 140 which are moved relative to stage 106 by rotation of condenser focus adjustment knob 114 to move condenser 142 and aperture diaphragm 140 either closer to or further from stage 106.

The optical components of microscope 100 may be thought of as originating at light source 120, which will typically have some type of electric filament 122 and may typically be a lamp such as a halogen or tungsten bulb. The particular nature of light source 120 is not critical to the invention, and other sources of light are known to work for particular applications, even, in some instances, providing preferable results. Many of the available sources are mentioned hereinabove in the background of the invention though nearly any source of illumination could conceivably be used. As is the normal practice, a collector lens 124 is preferably provided adjacent light source 120 to gather as much light as possible from light source 120, thereby maximizing the efficiency of light source 120 and reducing the amount of power and cooling required for operation of microscope 100. Mirror 126 serves to direct horizontally oriented optical energy from light source 120 along a vertical axis and through field diaphragm 128. Field diaphragm 128 serves primarily to control the total amount of light which is ultimately delivered to specimen 150, and, in the preferred embodiment combination of FIG. 1, field diaphragm 128 will most preferably be left in a wide-open position to allow maximum illumination. Reducing the field diaphragm 128 aperture will diminish the three-dimensional shadowcast effect which predominates in the present invention.

In the most preferred combination, edge plate 130 is located adjacent field diaphragm 128. Edge plate 130 is located within the general optical pathway indicated by optical axis 190, and as a result does block some light which would otherwise have passed through field diaphragm 128 and into condenser 142. Nevertheless, edge plate 130 will most preferably only block a minor percentage of the light passing through field diaphragm 128. After passing through field diaphragm 128 and interacting with edge plate 130, light will next pass through aperture diaphragm 140 which is adjacent condenser 142. Aperture diaphragm 140 will, in the preferred combination, also be left as open as possible so as to admit the maximum amount of light through condenser 142. Restricting aperture diaphragm 140 has the strong effect of "stopping down" condenser 142. At low magnifications, this will diminish the three-dimensional shadowcast effect. At high magnifications this will also undesirably increase the depth of field. Condenser 142 serves to focus light through specimen 150 into objective lens 160, which in turn forms a first virtual image of specimen 150. This image is further magnified by eyepiece 170, which might, for exemplary purposes only, include eyepiece field lens 172 and eyepiece eye lens 174. For standard viewing in accord with the preferred embodiment, no additional structure is necessary. However, if the microscope is so equipped, photographs may be taken of the magnified specimen through the use of a camera or film holder 180 having a shutter 182 and film plane 184.

Figure 2:
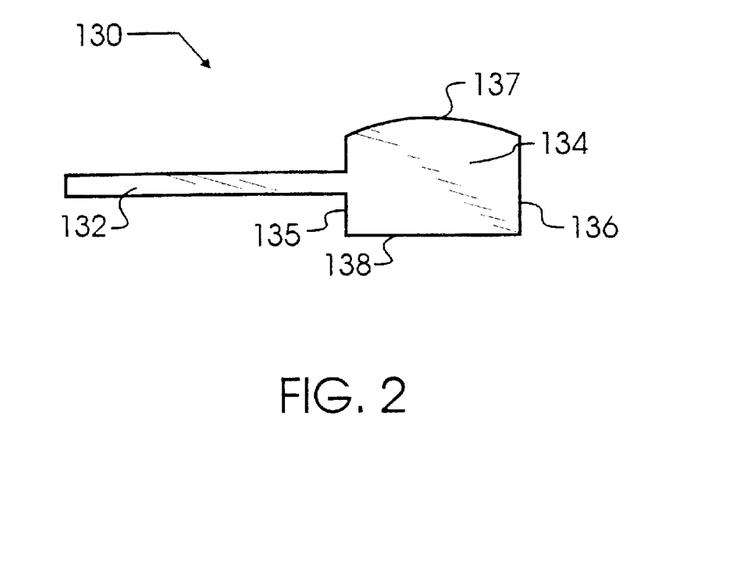
FIG. 2 illustrates a preferred embodiment apparatus of the invention of FIG. 1 from a top projected plan view.

As can be seen in FIG. 2, edge plate 130 includes a handle 132 which allows the manipulation of edge plate 130 by human hand, without adverse interaction with or contamination of adjacent optical components. Handle 132 will most preferably be made much thinner than body 134, to reduce the asymmetric disruption of the illuminating beam and any resulting astigmatism that would otherwise disrupt the image. Body 134 is bordered by inactive edges 135, 136 and 138. These inactive edges must be sufficiently spaced from active edge 137 to prevent any optical interaction within the active region of light cast by edge 137, as will be described hereinbelow. Otherwise, it is most preferable to maintain these edges as closely spaced as possible to minimize asymmetric blockage of light and resultant astigmatism. Active edge 137 is most preferably convex in geometry, as shown in FIG. 2. The thickness of edge plate 130 is not critical to the invention, though edge plate 130 is preferably formed from a relatively thin and lightweight sheet material such as black anodized aluminum, which is selected for the characteristics of low cost, ease of manufacture, durability, and inherent optical absorption. Handle 132 may also be stamped simultaneous with the balance of edge plate 130, or may alternatively be comprised by a small rod or other handle. Nevertheless, other materials having different properties and relative thickness may be used satisfactorily in the performance of the invention. While the most preferred embodiment edge plate 130 uses only a single active edge, it is noted herein that more than one edge may be designed to act as an active edge. For example, edge 138 may also be designed to be active though it will be understood that in order to prevent optical interaction between various edges, edge 138 will be active in a different region of specimen 150 than edge 137.

Figure 3:
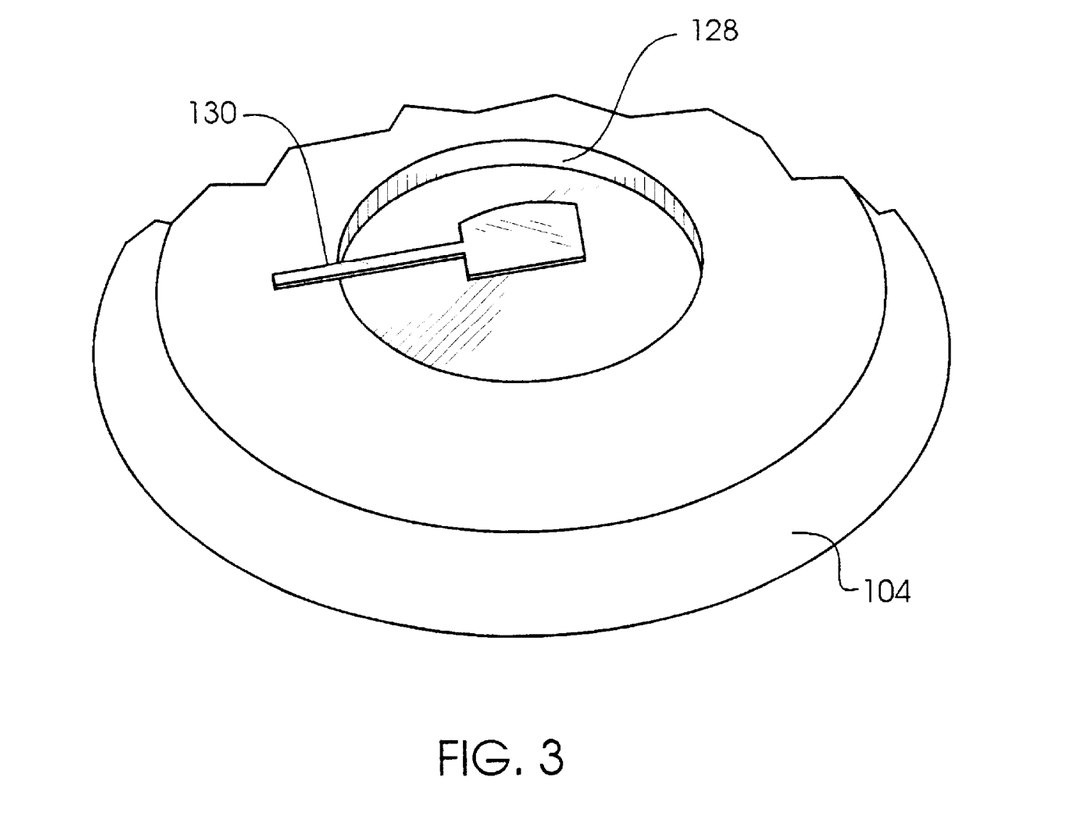
FIG. 3 illustrates the preferred combination of FIG. 1 from a close-up view illustrating the relative proportion of the preferred embodiment apparatus of the invention relative to the field diaphragm of the photographic microscope.

FIG. 3 illustrates the placement of edge plate 130 from a projected view, to better illustrate the arrangement and relative sizes of components. As can be seen therein, edge plate 130 forms a minor portion of the cross-section taken along optical axis 190, thereby admitting a majority of light through to condenser 142. As illustrated, handle 132 is not fixedly attached to microscope 100. Nevertheless, it will be understood that, when desired, one of ordinary skill will be able to modify handle 132 and microscope 100 to include various attachment points and mechanism, or other devices such as but not limited to bearing structures, that may be used to position edge plate 130 fixedly to microscope 100. One benefit of the smaller surface area of edge plate 130 which blocks light and the central location of edge plate 130, as shown in FIG. 3, is that astigmatism within the image is reduced. This only further benefits the clarity of the image formed by microscope 100.

Figure 4A:
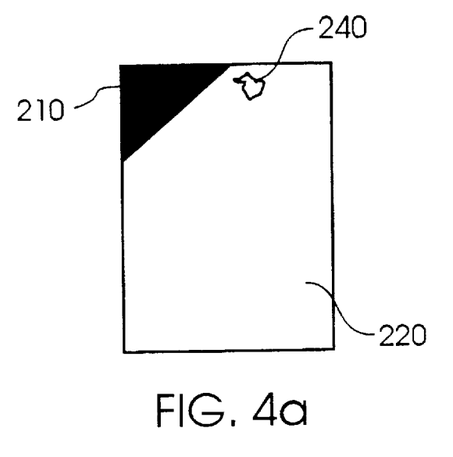
FIGS. 4a–4c illustrate a method step of the invention in association with the preferred combination.
Figure 4B:
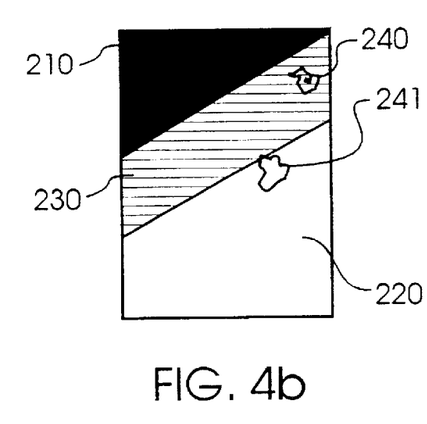
Figure 4C:
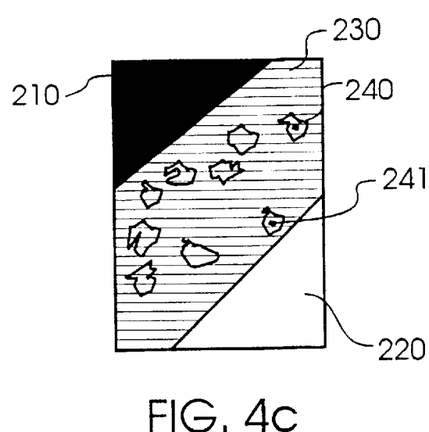

FIGS. 4a–4c illustrate the method of the invention as seen through eyepiece eye lens 174. In the preferred embodiment of FIG. 1, edge plate 130 will be at the level of field diaphragm 128. When microscope 100 has condenser 142 adjusted to its usual Koehler position, shown in FIG. 4a, a dark region 210 is evident, which is the shadow cast by edge 137 of edge plate 130. In the Koehler position, field diaphragm 128 will usually be in focus, and since edge plate 130 is at the same level, edge plate 130 will also be in focus and will cast a sharp shadow onto specimen 150 as represented by dark region 210. As can be seen in FIG. 4a, there is very little evidence of specimen 150 visible, though a light outline of cell 240 can be detected near the border between bright-field region 220 and dark region 210. However, when condenser focus adjustment knob 114 is adjusted to move condenser 142 either slightly up or down from the Koehler position, dark region 210 and bright-field region 220 become separated by a chromatic region 230. The initial adjustment produces only a small chromatic region 230 as shown in FIG. 4b, but nevertheless, an additional cell 241 becomes visible, and greater detail of cell 240 becomes visible, including not only membrane but also nucleus. Further defocussing results in a broadened chromatic region 230, as shown in FIG. 4c. This chromatic region 230 may be adjusted to completely cover the field of view through eyepiece 170. A much larger number of cells within specimen 150 are now visible, and once again the features within the first visible cells 240 and 241 are now much clearer. The chromatic region 230 will typically take on a relatively monochromatic blue color if the condenser is positioned just below the Koehler position, and a red color if the condenser is positioned just above the Koehler position, with edge plate 130 at the level of field diaphragm 128. While the invention is not solely limited to any particular theory, the chromatic light is believed to result from diffraction along active edge 137 of edge plate 130. Since the overall intensity of light within chromatic region 230 is reduced relative to the bright field region 220, it is plausible to increase the intensity of the light output by light source 120, though this may not be necessary in many cases.

Edge plate 130 may be positioned at any point essentially throughout the sub-stage illumination path. However, the most preferred location is as shown in FIG. 1, away from condenser 142. The image of edge plate 130 will be just slightly out of focus through condenser 142 with specimen 150. A second preferred location for edge plate 130 is between light source 120 and collector lens 124. Most preferably, and in either of the foregoing more preferred locations, edge plate 130 is supported by body 102 at base 104, and does not move when objective focus adjustment knob 112 is rotated, nor when condenser focus adjustment knob 114 is rotated. Several significant benefits are enured by this arrangement. First and foremost, there is no need for special spacings or clearance for edge stop 130. Were edge stop 130 to move together with condenser 142, there would have to be sufficient clearance to allow the motion of edge plate 130. Otherwise edge plate 130 must be positioned much more closely to condenser 142. And yet when edge plate 130 is located closer to condenser 142, edge plate 130 begins to adversely affect the optical characteristics of microscope 100, including in particular the depth of field and resolution. In addition, movement of the condenser could undesirably upset the positioning of edge plate 130, or could require more complex attachment between edge plate 130 and the surrounding support of microscope 100. Furthermore, not all microscopes have ready access at any one or more of the preferred locations. The placement of the preferred edge plate 130 of the present invention is very unrestrictive, allowing the present invention to be benefited from with a very wide variety of microscopes while not interfering with pre-existing components. Other benefits may additionally be gained by the relative motion between condenser 142 and edge plate 130. So, while edge plate 130 could be placed anywhere in the substage illumination path between light source 120 and stage 106, the most preferred region is at the level of field diaphragm 128. The otherwise more preferred placement includes anywhere between field diaphragm 128 and light source 120.

Figure 5:
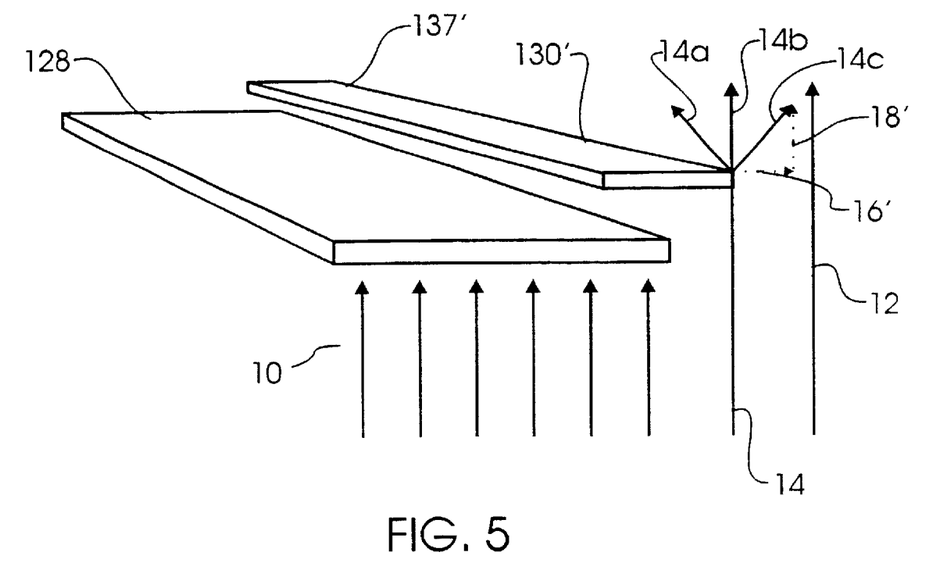
FIG. 5 illustrates the diffraction of light adjacent the edge of an alternative embodiment apparatus from a projected view.

While not wishing to be bound by any particular theory in those aspects of the invention which are otherwise understood and demonstrated to be operational using the techniques described and illustrated herein, FIG. 5 does illustrate broader basic principles of the invention. These broader features will be understood by those skilled in the art, upon a review of the present disclosure, to not be limited to any single physical structure or apparatus. Instead, these features of the present invention enable those skilled in the art to design a potential myriad of embodiments, which are, nevertheless, within the scope of the present invention and claims, and are enabled herein. As shown in FIG. 5, edge plate 130' has a straight active edge 137' that extends beyond field diaphragm 128. Light rays 10 are blocked by field diaphragm 128 and edge plate 130', while rays 12 pass unobstructed by either edge plate 130' or field diaphragm 128. A portion of the optical rays 14 will also be diffracted by edge plate 130' along active edge 137', forming a diffraction wave represented by rays 14a, 14b and 14c. The diffraction waves that result from interaction with an edge, represented by rays 14a–14c, are known to have regions of chromaticity. These chromatic regions are relatively monochromatic as a result of the diffraction occurring at edge plate 130'. As shown in FIG. 5, ray 14c has a vertical component 18 and a horizontal component 16. The diffracted rays 14 which form chromatic region 230 are then observed to interact with specimen 150 at regions of varying refractive index, such as at cell membranes and within the nucleus of the cell. The diffracted light is demonstrated herein to interact with these regions of varying refractive index to form new constructive (bright) or destructive (dark) interference patterns, or more simple additive and subtractive illumination regions. In either case, the net effect is substantially enhanced contrast which includes both brightening and darkening of various entities and regions within specimen 150.

Figure 6:
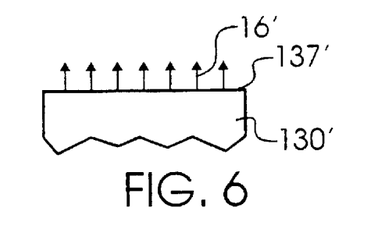
FIG. 6 illustrates the diffraction of light into the bright field region from the alternative embodiment of FIG. 5, from a top plan view.
Figure 7:
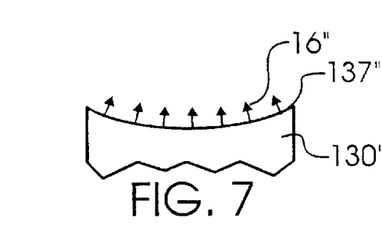
FIG. 7 illustrates the diffraction of light into the bright field region from a second alternative embodiment apparatus from a top plan view.
Figure 8:
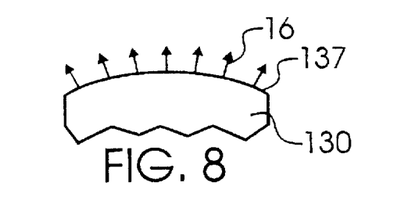
FIG. 8 illustrates the diffraction of light into the bright field region from the preferred embodiment apparatus from a top plan view.

Several additional features of the present invention serve to further refine and enhance the imaging of a specimen, and these features are illustrated in FIGS. 6–8. As shown in FIG. 6, alternative embodiment edge plate 130' having a straight active edge 137' is shown to have a diffraction pattern in the lateral direction transverse to optic axis 190 towards bright field region 220, as illustrated by arrows 16'. Arrows 16' neither diverge nor converge. As shown in FIG. 7, edge plate 130" has a concave active edge 137" which has a diffraction pattern in the lateral direction shown by rays 16" towards bright field region 220. As is evident, these rays tend to converge. As shown in FIG. 8, edge plate 130 has active edge 137 which is convex in shape. Rays 16 which are diffracted from active edge 137 towards bright field region 220 tend to diverge.

The use of convex active edge 137 has been demonstrated to provide substantially better contrast and more three-dimensional images within an ordinary biological specimen 150 than obtained with straight active edge 137', while straight active edge 137' provides clearer resolution than achieved with concave active edge 137". The use of convex edge 137 therefore provides substantial additional advantage. While not wishing to be bound by any particular theory of operation, this advantage is believed to be due to the nature of diverging rays 16. In a theoretically perfect optical system, the relationship between rays 16 will hold throughout the optical system. However, since all lenses are imperfect due to aberrations, a certain amount of angular deflection will occur between rays emanating from adjacent areas of the edge. Furthermore, all real edges are also imperfect, including edge 137, and will have optically significant defects therein which can misdirect adjacent rays 16. Finally, specimen 150 may also have imperfections that would tend towards generating undesired interference. Rays 16 which diverge are less prone to optical interference with adjacent rays, due to the slight divergence. The slight divergence tends to negate the effects of optically detectable imperfections present in edge 137 and optical defects present in the remaining optical components of microscope 100. This benefit is further enhanced by the relative monochromaticity of chromatic region 230, which limits interfering refraction from other wavelengths that might otherwise tend to blur or even completely mask the specimen image of the present invention. Other edge geometries which offer benefit of diverging rays 16 similar to convex edge 137 are also contemplated, and will be understood by those skilled in the art to be included herein.

While, in most cases, it will be desirable to utilize a convex edge, the present invention contemplates and enables application of various edge plates each having differently configured active edges. For example, and as illustrated in FIGS. 6–8, there may be applications requiring edge plate 130' with straight edge 137' or edge plate 130" with concave edge 137". Owing to the mechanical simplicity of the invention, various edge plates may be inserted during one viewing session, which will allow multiple perspectives to be taken of a single specimen. Because edge plate 130 is most preferably fabricated from a durable material such as anodized aluminum, other surface treated metals, or even plastics, ceramics, composites or any other suitable material, edge plate 130 will be resistant to damage or breakage. This can be particularly important in the applications such as school laboratories, where the tools should be both durable and of low cost.

As demonstrated by the preferred embodiment, the relatively monochromatic diffracted light which is interacted in an additive and subtractive or constructive and destructive way provides far better contrast enhancement and resolution of specimens than heretofore available with other techniques. As a result of the interaction between diffracted light, bright-field light and specimen, and the further combination of benefits from convex active edge 137, the present invention exceeds contrast enhancement achieved by oblique illumination, and equals or exceeds that achieved by the much more complex and expensive research techniques such as differential interference contrast. Since field of depth is not adversely impacted by the relatively small edge plate 130, the image remains clear and uncluttered, as demonstrated by FIGS. 4a–4c herein.

INDUSTRIAL APPLICABILITY

Within the region jointly accompanied by diffracted rays 14c and rays 12 from FIG. 5, the specimen has greatest contrast. The simultaneous additive and subtractive nature of reflection and/or interference patterns that are created within chromatic region 230 due to the interaction between diffracted light 14, bright-field illumination 12 and specimen 150 yields astounding contrast. Owing to the simple nature of the apparatus required to generate this enhanced contrast, there are many applications for which the present invention is suited, only one of which is in the area of biological analysis and observation. Other known applications of microscopy which have heretofore been difficult due to insufficient contrast but which provide specimens having varying optical properties will also be served by the present invention. Since the objects of the invention are, as described in the description of the preferred embodiment, achieved by the present invention, the present invention is applicable industrially not only to new microscopes, but also to low-cost retrofitting of existing microscopes. This retrofit enables enhancement of contrast sufficient to bring heretofore invisible features into full view through an ordinary eyepiece in an ordinary microscope.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example, while the preferred embodiment illustrates the use of a compound microscope having an internal light source 120, the edge plate of the present invention may be implemented in other light paths that originate from other types of sources, and in other optical arrangements besides the preferred compound microscope, as will be ascertainable by those skilled in the art upon a review of the present disclosure. Structures and configurations that provide the equivalent effects as the present edge plate are contemplated herein. Rather than be limited by the disclosure of a single preferred embodiment, the full scope of the invention is instead set forth and described in the claims hereinbelow.

I claim:

1. An apparatus for viewing a refractive specimen, comprising:
   a microscope having a stage for locating a specimen within an optical path, a light source illuminating said optical path, and a means for forming an enlarged virtual image of a first part of said specimen;
   an edge plate within said optical path having a surface area which blocks a part of said illumination, a convex edge diffracting said illumination adjacent said edge to produce a chromatic diffraction region, and a perimeter edge which extends from said convex edge and encloses said edge plate surface area; and
   means for adjusting a location of said chromatic diffraction region to illuminate said stage adjacent to a bright field region while simultaneously directing diffraction along said perimeter edge to a different region of said specimen.

2. The apparatus for viewing a refractive specimen of claim 1, wherein said chromatic diffraction region fully illuminates said first part of said specimen.

3. The apparatus for viewing a refractive specimen of claim 1, further comprising a second diffracting edge within said perimeter edge which is a functional substitute for said convex edge.

4. The apparatus for viewing a refractive specimen of claim 1, wherein a width of said edge plate is sufficient to maintain said perimeter edge diffraction in said different region, whereby interaction between diffraction from said convex edge and said perimeter edge is avoided.

5. The apparatus for viewing a refractive specimen of claim 1, wherein said surface area blocks a minority of said illumination.

6. The apparatus for viewing a refractive specimen of claim 1, wherein said means for adjusting is an adjustable condenser lens.

7. The apparatus for viewing a refractive specimen of claim 6, wherein said edge plate is located remotely from said condenser lens and said adjusting occurs through relative motion between said condenser lens and said edge plate.

8. The apparatus for viewing a refractive specimen of claim 1, wherein said edge plate further comprises a rugged, non-frangible material.

9. The apparatus for viewing a refractive specimen of claim 8, wherein said edge plate is comprised by a surface-treated metal.

10. The apparatus for viewing a refractive specimen of claim 1, further comprising a phase
   whereby said phase contrast objective lens interacts with said chromatic diffraction region to successfully analyze said specimen without the further need for a matched condenser annular aperture.

11. An apparatus for displaying a three-dimensional shadowcast image, comprising:

a chromatic light source producing a chromatic light at an optical juncture between a dark shadow and a bright field and which diverges towards said bright field;

a refractive specimen illuminated by said diverging light between said dark shadow and said bright field to form distinctive optical illumination maximums and minimums; and an optical display of the distinctive illumination as a major part of the field of view.

12. The apparatus for displaying a dimensional shadowcast image of claim 11, further comprising a mask within a bright field illumination path which interacts with broad-spectrum illumination to produce said diverging chromatic light.

13. The apparatus for displaying a three-dimensional shadowcast image of claim 12, wherein said mask is encompassed by said broad-spectrum illumination, and said dark shadow is cast by said mask.

14. The apparatus for displaying a three-dimensional shadowcast image of claim 11, further comprising a means for varying the wavelength and extent of said chromatic light illuminating said refractive specimen.

15. A method for enhancing optical contrast of a refractive specimen, comprising the steps of:

diffracting light at a first location displaced from and preceding said refractive specimen within an optical pathway;

defocussing a condenser lens by relative motion between said condenser lens and said first location to illuminate a portion of said refractive specimen with said light diffracted at said first location; and magnifying said illuminated portion of said refractive specimen.

16. The method for enhancing contrast of a refractive specimen of claim 15, comprising the additional step of varying the convergence or divergence of said diffracted light from said first location, thereby varying the contrast and shadowcast effect.

17. The method for enhancing contrast of a refractive specimen of claim 15, wherein said diffracting results from interaction with a convex edge.

18. The method for enhancing contrast of a refractive specimen of claim 15, comprising the additional step of inserting an edge plate into said optical pathway.

19. The method for enhancing contrast of a refractive specimen of claim 15, comprising the additional steps of:

passing broad-spectrum optical radiation through said optical pathway;

adjusting said edge plate to a central location relative to said optical pathway, whereby said broad-spectrum optical radiation passes around and substantially encircles said edge plate, thereby minimizing astigmatism in said magnified illuminated portion of said refractive specimen.

20. The method for enhancing contrast of a refractive specimen of claim 15, wherein said step of magnifying further comprises inserting a phase contrast lens into said optical pathway.

* * * * *